Patented June 16, 1936

2,043,992

UNITED STATES PATENT OFFICE 2,043,992

PETROLEUM OXIDATION PRODUCTS AND THEIR UTILIZATION

Carleton Ellis, Montclair, N. J., assignor to Ellis-Foster Company, a corporation of New Jersey No Drawing. Application January 29, 1925,
Serial No. 5,634

24 Claims. (Cl. 260—2)

This invention relates to petroleum oxidation products and to their utilization and relates especially to products obtained in the oxidation and/or cracking of heavy oils such as petroleum oil, shale oil, asphalt, gilsonite and the like.

The object of the invention is to render petroleum more generally available for diverse industrial purposes, entirely beyond the scope of its usual field of fuels, lubricants, waxes, etc.

This application is a continuation in part of Serial 743,453, Process of cracking and oxidizing oils, filed October 13, 1924 now patent 1,697,266, which in turn is derived from the subject matter of Patent 1,517,968, patented December 2, 1924, Cracking and oxidizing petroleum oil to make gasoline and useful products of oxidation.

In said patent and patent application I have referred to the production of aldehydes by the oxidation of petroleum and also to the derivation of resinous substances by the process described therein.

The present invention is particularly concerned with the evaluation or utilization of petroleum aldehydes, as the aldehydic bodies obtained by oxidation may be termed, and also in rendering more useful the resinous substances obtained in the oxidizing operation and in later refining steps.

The materials required in the present invention therefore may be made in accordance with the disclosures of Patent 1,517,968, or Serial 743,453. Analogous products may be made by blowing air through oil especially when under pressure and heated to a suitable temperature. For example gas oil at a pressure of 300 lbs., temperature 385° C. to about 400° C., may be blown with preheated air and the products of oxidation collected, preferably under pressure. A condensate is obtained in two layers, one consisting of more or less volatile hydrocarbons, and an aqueous layer containing petroleum aldehydes and various water soluble bodies. The aqueous condensate and also washings obtained from the hydrocarbon condensate may be distilled to separate light fractions containing acetaldehyde and higher aldehydes. Further distillation yields various solvents. By purifying these through treatment with caustic soda and re-distillation resinous or gummy material is obtained. This resinous material may be used in accordance with the present invention in the same manner as the resin described in Patent 1,517,968 and in specification of Serial 743,453. For example in the latter specification, page 7, I state that by carrying out the oxidation at a temperature of 300° to 400° C. aldehydes and fatty acids are obtained. A small amount of formaldehyde sometimes is produced but higher aldehydes, especially acetaldehyde, predominate. The treatment of the aqueous solution containing aldehydes and acids is preferably as follows: If the aldehyde is desired in the free state the solution is rendered neutral with caustic soda and distilled with steam. The aldehyde is carried over and the aqueous solution becomes practically odorless. The higher aldehydes may be employed in various ways, for example they may be made to react with, or in the presence of caustic soda, to form resinous substances. In one case a resin of this sort produced from kerosene as described in Serial 743,453 was obtained in the form of a light brown powder which when melted was a resinous substance. Aldehydes obtained by the process are capable of polymerization and condensation (Serial 743,453, page 10). When caustic alkali is employed in the refining operation any organic acids obtained will form salts which can be thus separated from the solvents and aldehydes and the organic acids subsequently liberated by treatment with a mineral acid and distillation or separation in any other suitable manner.

The gum or resin obtained in the alkali treatment by itself is of little value, it is usually a reddish product ranging in consistency from a sticky gummy mass to a resin of more brittle qualities. Simple heating usually serves to harden it but at the same time tends to deepen the color. For some purposes the color of the resin should be preserved as dark colored or black products are undesirable.

It may be noted that petroleum resins have been derived in various ways but these have in the past usually been obtained from acid sludge and residues such as pitch, asphalt and the like and generally are black, brittle, ill-smelling substances which are of no practical value in making products contemplated in accordance with the present invention. Resins have been obtained from cracked petroleum by polymerizing diolefins and the like but these in the main are hydrocarbon resins while the resin particularly utilized in accordance with the present invention, in its preferred form is one obtained through the agency of an oxidation process and the gummy or resinous product obtained hereunder contains a considerable amount of oxygen in combination and has a reactivity substantially different from the relatively inert hydrocarbon resins. It may be termed reactive oxygenated petroleum resin to distinguish it from pitches and tars customarily obtained in the various operations of refining petroleum oil.

For example equal parts of phenol and such reactive gum were heated in the presence of a small amount of hydrochloric acid. A resinous solid was obtained which when mixed with about 10 per cent of hexamethylenetetramine was found to set or harden on heating. The union therefore of the phenol with the reactive oxygenated petroleum resin yielded a resinous derivative reactive with hexamethylenetetramine.

In the oxidation of petroleum a considerable amount of phenoloid bodies are derived and such bodies may be permitted to react with the reactive oxygenated petroleum resin to make resinous derivatives of an analogous character. These in turn may be given more rapid thermosetting qualities by the addition of hexamethylenetetramine. The addition of the latter substance is however not essential as such a resinous complex may be hardened by baking. Thus molded articles may be made from this resinous complex by cold pressing and the molded articles then baked carefully until hardened to the desired degree.

The resins thus obtainable may be used in hot pressing or hot molding operations as well as in cold molding. They may be used alone in order to get clear resinous hard products or they may be mixed with the usual fillers such as are now employed in the rubber, paint, linoleum and synthetic resin industries; a list of which need not be given herein in detail.

Such resins also may be mixed with other natural or synthetic resins such as acetone-formaldehyde resin, urea-formaldehyde resin, phenol-formaldehyde resin, phthalic glyceride resin, salicylic phthalic glyceride resin, rosin phthalic glyceride resin, benzoic glyceride resin and the like to modify its properties in various desired ways.

Blown asphalts and other resins of petroleum origin, but not having the reactive properties of the oxygenated petroleum resin of the present invention, likewise may be added in some cases but in general are not recommended because of the tendency to brittleness, discoloration, etc.

The present invention has for its object to obtain from petroleum by combination of the various substances obtained by an oxidation step or by the employment of such substances along with substances obtained from other sources, a high grade resin capable of being used in fabricated products of high quality. For example molded articles to serve as electrical insulation, for ornamental purposes, as tool handles, umbrella handles, smokers' utensils, billiard balls, bed castors and numerous other articles of this character; likewise in the form of lacquers and enamels, as varnishes for coating wood and metallic surfaces. In this case the varnish may be of a kind which will be finished simply by drying of the solvent or it may be of the enamel type which requires baking to accomplish the requisite hardening effect. Solutions may be made of the resin of the present invention which may be employed for impregnating cloth, paper or other tissue, the impregnated material being pressed together to build up blocks or sheets of appropriate toughness and strength to serve as radio panels, for making gears and many other uses where a tough hard product is required.

The reactive oxygenated petroleum resin may be combined with acetaldehyde and higher aldehydes obtained in the oxidizing operation as for example by heating with caustic alkali; or the reactive oxygenated petroleum resin may be reacted with the phenoloid bodies obtained in said oxidizing operation; or the reactive oxygenated petroleum resin may be treated with acetaldehyde and higher aldehydes in the presence of said phenoloid bodies, or in some cases phenol, cresol, xylenol or other like substances derived from others sources may be introduced into the reaction mixture to supplement conversion to a resin of desired characteristics.

Since the proportions of resin, aldehydes and phenoloid bodies obtained in oxidation may be expected to vary with different kinds of crude oil material employed and since such proportions may not always be those desired for use in making finished resins, suitable for fabricated products there may be an excess of some of the products which may be diverted to other uses. Also it may be necessary as indicated above to draw on outside sources for certain of the raw materials required in making special products.

For example furfural may be employed in building up a resinous composite in accordance with the present invention and this substance may be acquired from an outside source. Phenols, naphthols and the like may be secured in a similar manner in order to obtain the requisite proportion of ingredients for special purposes.

In general however the products of the present invention whether appearing as resins, molded products, lacquers or varnish coatings, laminated pressboard, laminated cloth and the like contain essentially a resin of petroleum derivation. Thus the product may be derived directly from the reactive oxygenated petroleum resin or by combining it with various other substances as indicated or it may be made by reacting with acetaldehyde derived from the oxidation of petroleum, which acetaldehyde is combined with phenol or phenolic bodies, naphthols and the like, the reaction preferably being carried out in the presence of an acid catalyst to form a resin. Or a mixture of acetaldehyde and higher aldehydes for example the crude petroleum aldehyde distillate may be combined with phenolic bodies in the presence of an acid catalyst to yield a resin. As very little formaldehyde is obtained in the process under normal conditions it is likewise possible when formaldehyde obtained by the process is insufficient in quantity to secure formaldehyde from other sources and react the formaldehyde with the reactive oxygenated petroleum resin and phenol to produce a composite resinous product. In like manner acetaldehyde or a mixture of acetaldehyde and higher aldehydes obtained in the petroleum oxidation process may be reacted with phenol and formaldehyde to obtain a complex resin. Phenoloid bodies obtained in the operation may be employed and if desired these may be supplemented by the addition of phenol or cresol obtained for example from coal tar. The phenoloid bodies from petroleum may be entirely replaced by such substances in some cases.

As an example 25 parts by weight of soft sticky gum resin derived by petroleum oxidation was incorporated with 50 parts of phenol and 12½ parts of acetaldehyde of petroleum origin. Approximately 3 parts by weight of concentrated hydrochloric acid were added. The mixture was heated under a reflux condenser for approximately 1 hour, the temperature reaching about 105° C. The secondary resin thus obtained was heated to approximately 150° C. to eliminate water and hydrochloric acid. The dry resin was dissolved in approximately an equal weight of alcohol and 10 per cent of hexamethylenetetramine, based on the weight of the resin, was added. This solution was incorporated with wood flour equal in weight to the resin and the mixture was dried in a vacuum dryer, the temperature being raised gradually to 95° C. with the gauge of the dryer registering 26 inches. Composition was put into molds and pressed at a temperature of 160° C. with the gauge of the press registering 1000 pounds. Setting took place rapidly and articles properly cured were obtained in less than 5 minutes' time. Sticking to the mold is likely to occur with resins made from the petroleum aldehydes and the addition of 1 or 2 per cent of a water-insoluble soap such as aluminum palmitate or zinc stearate may be required to overcome this difficulty.

Another product was made by treating reactive oxygenated petroleum resin, having a low melting point with acetaldehyde of petroleum origin, phenol and furfural to make a resinous complex having good flowing qualities in the mold.

12½ parts by weight of the primary resin, 12½ parts of acetaldehyde of petroleum origin, 50 parts of phenol and approximately 3 parts of concentrated aqueous hydrochloric acid were heated together for an hour under a reflux condenser, the temperature reaching approximately 105° C. The condenser was removed and the contents of the vessel heated to 150° C. 5 parts of potassium carbonate and 12½ parts of furfural were added and heat again applied, employing a reflux condenser. Reaction took place and heating was continued for approximately an hour when the resin was dried and hardened somewhat by heating to 150° C. This resin was dissolved in alcohol hexamethylenetetramine and wood flour added as in the foregoing example and the composition dried and molded in like manner. It hardened well in the mold although not quite so rapidly as the product of the preceding example and was found to flow well when hot pressed.

To recapitulate the invention is concerned with the art of rendering petroleum more generally available for diverse industrial purposes than those heretofore commonly recognized. In one form the invention is concerned with oxidizing petroleum to generate aldehydic substances converting some part at least of the latter into resinous material and employing said resinous material as a binder in plastics, in making laminated fibre and electrical insulation as well as varnishes, lacquers, enamels and the like. The invention involves in one form the resinification process which comprises reacting on the phenoloids of oxidized petroleum with the aldehydes of oxidized petroleum. The aldehydes may be the mixture of such compounds as normally obtain or may be special fractions or even the substantially pure individual aldehyde. The reaction may be carried out to advantage in the presence of a catalyst such as an alkali or an acid and preferably an acid. The resin thus obtained may be admixed with fillers and molded by hot pressing or cold molding methods. When hot molding methods are employed it may be advantageous to include in the molding composition a few per cent of hexamethylenetetramine. When the oxidation process is such that a substantial proportion of acetaldehyde is obtained this substance in the pure or crude state may be employed so that the process involved would be that of reacting on a phenolic body with acetaldehyde of petroleum origin or with the aldehydes of oxidized petroleum comprising essentially acetaldehyde. The process however is not limited to the phenoloids of oxidized petroleum as these may be replaced wholly or in part by phenol, cresol, xylenol and other similar compound. Another modification is that of employing reactive oxygenated petroleum resin or gum in making a resinous material of commercial value. The crude petroleum resin of this character is by itself a relatively low grade product but by subjecting it to the action of a phenoloid body such as substances of this kind obtained in petroleum oxidation, carrying out the reaction in the presence of a catalyst, especially a mineral acid, resins of commercial significance are obtained. In addition to phenoloid bodies from this source phenols, cresols, xylenols and the like from coal tar or other source may be employed in whole or in part. Employing the reactive oxygenated petroleum resin as the essential ingredient resins may be built from it with the aid of a phenol and acetaldehyde, preferably of petroleum origin, or of a mixture of petroleum-derived aldehydes containing a major proportion of acetaldehyde which can be used to advantage in making molding compositions. Thus such a material by itself has the property of hardening or setting when heated and the reaction is facilitated by adding hexamethylenetetramine, yielding for example a molding composition comprising a heat-setting resin of petroleum origin usually incorporated with filling material. Specifically resins may be prepared from such substances as ortho, meta or para cresol or xylenol and an aldehyde of petroleum orgin. Using aldehydic material originating in this manner certain impurities or by-products often may be present which accelerate the reaction and tend to give a harder and stronger resin. In other cases the impurities may have valuable fluxing or plasticizing properties. The latter effect is facilitated by the employment of hexamethylenetetramine triphenol and the like. Varnishes may be made by dissolving any of the soluble forms of the herein described resins in a solvent, for example a mixture of benzol and alcohol. Still another modification is that of reacting on a portion at least of the oxidized products of petroleum with a neutralizing agent to form salts of organic acids and separating aldehydic substances therefrom. Such substances then may be converted to resins in the manner herein described. Instead of neutralizing an excess of alkali for example caustic soda or its equivalent, caustic potash, may be employed to induce a primary resinification. Such a primary resin of an oxygenated character is normally reactive and from it secondary resins are obtainable by reaction with phenol, with or without aldehydes such as formaldehyde, butyl aldehyde, furfural and the like. The production of secondary or commercially useful resins from the crude primary resin or gum may be carried out in more than one stage as for example by reacting on the gum with phenol in the presence of an acid catalyst and subsequently reacting on that product with furfural in the presence of an alkaline catalyst.

By the term "phenoloid" is meant a material which resembles or reacts like a phenol in resinifying reactions.

By the term "reactive oxygenated petroleum resin" is meant a material of resinous nature obtained in the oxidation of petroleum and related hydrocarbons, which resinous material contains a considerable amount of oxygen in combination, and exhibits a pronounced reactivity toward such materials as aldehydes, phenols and phenoloid bodies, etc.

What I claim is:—

1. The resinification process which comprises reacting on the phenoloids of oxidized petroleum with the complex, mixed aldehydes of oxidized petroleum.

2. The resinification process which comprises reacting on the phenoloids of oxidized petroleum with the complex, mixed aldehydes of oxidized petroleum comprising essentially acetaldehyde.

3. The resinification process which comprises reacting on the phenoloids of oxidized petroleum with the complex, mixed aldehydes of oxidized petroleum in the presence of a catalytic substance.

4. The resinification process which comprises reacting on the phenoloids of oxidized petroleum with the complex, mixed aldehydes of oxidized petroleum in the presence of an acid catalyst.

5. The resinification process which comprises subjecting reactive oxygenated petroleum resin to the action of aldehydes from oxidized petroleum.

6. The resinification process which comprises subjecting reactive oxygenated petroleum resin to the action of aldehydes from oxidized petroleum comprising essentially acetaldehyde.

7. The resinification process which comprises subjecting reactive oxygenated petroleum resin to the action of a phenoloid body.

8. The resinification process which comprises subjecting reactive oxygenated petroleum resin to the action of a phenoloid body in the presence of a catalyst.

9. The resinification process which comprises subjecting reactive oxygenated petroleum resin to the action of a phenoloid body in the presence of an acid catalyst.

10. The resinification process which comprises subjecting reactive oxygenated petroleum resin to the action of a phenoloid body in the presence of an acid catalyst and incorporating with the resinified material a small proportion of hexamethylenetetramine.

11. The resinification process which comprises subjecting reactive oxygenated petroleum resin to the action of at least two aldehydic substances.

12. The resinification process which comprises subjecting reactive oxygenated petroleum resin to the action of at least two aldehydic substances in the presence of a phenol.

13. A resinous body prepared from reactive oxygenated petroleum resin, phenol and acetaldehyde.

14. A resinous body prepared from reactive oxygenated petroleum resin, a phenolic body and aldehydes from oxidized petroleum.

15. A resinous body prepared from reactive oxygenated petroleum resin, phenol, acetaldehyde and another aldehyde.

16. A resinous body prepared from reactive oxygenated petroleum resin, phenol, a plurality of aldehydes and hexamethylenetetramine.

17. The process which comprises heating reactive oxygenated petroleum resin with phenol in the presence of an acid catalyst, adding aqueous formaldehyde and continuing the heating.

18. The process which comprises reacting on a phenolic body and reactive oxygenated petroleum resin with acetaldehyde of petroleum origin in the presence of an acid catalyst.

19. The process which comprises heating a reactive oxygenated petroleum resin with phenol in the presence of an acid catalyst and furfural in the presence of an alkaline catalyst.

20. In the manufacture of phenolic condensation products, the steps comprising causing a phenolic body to react with an oil mainly of the aliphatic type and containing hydrocarbon derivatives of different molecular weights having an aldehyde base to form an initial condensation product and thereafter heating the same to form a hard infusible insoluble synthetic resin.

21. In the manufacture of phenolic condensation products, the step consisting of reacting with a phenolic body an alkali resinified mixture of oxidized hydrocarbon derivatives mainly of the aliphatic type resulting from a vapor or gaseous phase reaction between carbon hydrogen and oxygen containing materials, said product containing bodies of different molecular weights having aldehyde properties.

22. In the manufacture of phenolic condensation products, the step consisting of treating with a phenolic body an alkali resinified fraction of a liquid mixture of oxidized hydrocarbon derivatives mainly of the aliphatic type containing bodies having aldehyde properties formed by vapor or gaseous phase reaction between carbon, hydrogen and oxygen containing materials.

23. As a new article of manufacture, a hard infusible insoluble synthetic resin formed by the reaction between phenolic bodies and a mixture of resin acids derived from oxidized hydrocarbon derivatives formed by vapor or gaseous phase catalytic reaction of carbon-hydrogen-oxygen containing gases, said acids being of different molecular weights.

24. As a new article of manufacture, a hard infusible insoluble synthetic resin formed by the reaction between a phenolic body and an oxidized hydrocarbon mixture formed by the vapor or gaseous phase reaction of hydrocarbon and oxygen containing vapors or gases, said derivatives containing bodies of different molecular weights having aldehyde properties.

CARLETON ELLIS.